United States Patent
Hamagishi (10) Patent No.: US 7,623,188 B2
(45) Date of Patent: Nov. 24, 2009

(54) DIRECTIONAL DISPLAY DEVICE

(75) Inventor: Goro Hamagishi, Toyonaka (JP)

(73) Assignee: Seiko Epson Corporation, Tokyo (JP)

( * ) Notice: Subject to any disclaimer, the term of this patent is extended or adjusted under 35 U.S.C. 154(b) by 44 days.

(21) Appl. No.: 12/117,578

(22) Filed: May 8, 2008

(65) Prior Publication Data

US 2008/0278639 A1  Nov. 13, 2008

(30) Foreign Application Priority Data

May 9, 2007  (JP)  ............... 2007-124306

(51) Int. Cl.
*G02F 1/1335* (2006.01)
(52) U.S. Cl. .............. 349/8; 349/1; 349/5; 349/9; 349/56; 349/57
(58) Field of Classification Search .............. 349/1, 349/5, 8, 9, 56, 57
See application file for complete search history.

(56) References Cited

U.S. PATENT DOCUMENTS 6,628,355 B1 *  9/2003  Takahara ............... 349/106
7,561,231 B2 *  7/2009  Kanbe et al. ............ 349/113

FOREIGN PATENT DOCUMENTS

| JP | 08-331605 | 12/1996 |
| JP | 2005-181668 | 7/2005 |
| JP | 2006-337496 | 12/2006 |
| JP | 2006-337844 | 12/2006 |

* cited by examiner

*Primary Examiner*—Jennifer Doan
(74) *Attorney, Agent, or Firm*—Workman Nydegger

(57) ABSTRACT

A directional display device that separates and displays images on an image display surface of a display panel in different viewing directions. The directional display device includes a polarization control unit which is arranged in front of the display panel. A liquid crystal lens is arranged in front of the polarization control unit. A polarization plate is arranged in front of the liquid crystal lens. The polarization control unit has first and second polarization areas which change incident light rays to light rays having different polarization axes. The liquid crystal lens includes a lens layer including having lenses with a predetermined refractive index and a liquid crystal layer. An alignment state of the liquid crystal layer is changed so as to change the refractive index of the liquid crystal layer and change the refractive power of the liquid crystal lens.

6 Claims, 11 Drawing Sheets

FIG. 3  REFERENCE ARRANGEMENT
(LONGITUDINAL DIRECTION ARRANGEMENT)

FIG. 4  REFERENCE ARRANGEMENT
(LONGITUDINAL DIRECTION ARRANGEMENT)

FIG. 7A

VIEWING IMAGE OF LEFT EYE 30L IN REFERENCE ARRANGEMENT (LONGITUDINAL DIRECTION ARRANGEMENT)

A (LATERAL): HORIZONTAL ⟷
B (LONGITUDINAL): VERTICAL

FIG. 7B

VIEWING IMAGE OF RIGHT EYE 30R IN REFERENCE ARRANGEMENT (LONGITUDINAL DIRECTION ARRANGEMENT)

A (LATERAL): HORIZONTAL ⟷
B (LONGITUDINAL): VERTICAL

LATERAL DIRECTION ARRANGEMENT

| R | Rp | R | Lp | R | Rp | R | Lp | R | Rp |
|---|----|---|----|---|----|---|----|---|----|
| G | Rp | G | Lp | G | Rp | G | Lp | G | Rp |
| B | Rp | B | Lp | B | Rp | B | Lp | B | Rp |
| R | Rp | R | Lp | R | Rp | R | Lp | R | Rp |
| G | Rp | G | Lp | G | Rp | G | Lp | G | Rp |
| B | Rp | B | Lp | B | Rp | B | Lp | B | Rp |
| R | Rp | R | Lp | R | Rp | R | Lp | R | Rp |
| G | Rp | G | Lp | G | Rp | G | Lp | G | Rp |
| B | Rp | B | Lp | B | Rp | B | Lp | B | Rp |
| R | Rp | R | Lp | R | Rp | R | Lp | R | Rp |
| G | Rp | G | Lp | G | Rp | G | Lp | G | Rp |
| B | Rp | B | Lp | B | Rp | B | Lp | B | Rp |
| R | Rp | R | Lp | R | Rp | R | Lp | R | Rp |
| G | Rp | G | Lp | G | Rp | G | Lp | G | Rp |
| B | Rp | B | Lp | B | Rp | B | Lp | B | Rp |

~14

A (LATERAL): VERTICAL

B (LONGITUDINAL): HORIZONTAL

FIG. 11A

VIEWING IMAGE OF LEFT EYE 30L IN LATERAL DIRECTION

| | R Lp | | R Lp | |
|---|---|---|---|---|
| | G Lp | | G Lp | |
| | B Lp | | B Lp | |
| | R Lp | | R Lp | |
| | G Lp | | G Lp | |
| | B Lp | | B Lp | |
| | R Lp | | R Lp | |
| | G Lp | | G Lp | |
| | B Lp | | B Lp | |
| | R Lp | | R Lp | |
| | G Lp | | G Lp | |
| | B Lp | | B Lp | |
| | R Lp | | R Lp | |
| | G Lp | | G Lp | |
| | B Lp | | B Lp | |

A (LATERAL): VERTICAL ↕

B (LONGITUDINAL): HORIZONTAL ↔

FIG. 11B

VIEWING IMAGE OF RIGHT EYE 30R IN LATERAL DIRECTION

| R Rp | | R Rp | | R Rp |
|---|---|---|---|---|
| G Rp | | G Rp | | G Rp |
| B Rp | | B Rp | | B Rp |
| R Rp | | R Rp | | R Rp |
| G Rp | | G Rp | | G Rp |
| B Rp | | B Rp | | B Rp |
| R Rp | | R Rp | | R Rp |
| G Rp | | G Rp | | G Rp |
| B Rp | | B Rp | | B Rp |
| R Rp | | R Rp | | R Rp |
| G Rp | | G Rp | | G Rp |
| B Rp | | B Rp | | B Rp |
| R Rp | | R Rp | | R Rp |
| G Rp | | G Rp | | G Rp |
| B Rp | | B Rp | | B Rp |

A (LATERAL): VERTICAL ↕

B (LONGITUDINAL): HORIZONTAL ↔

DIRECTIONAL DISPLAY DEVICE

BACKGROUND

1. Technical Field

The present invention relates to a directional display device capable of simultaneously displaying different images in every viewing direction when viewed from a plurality of directions, such as a two-screen display device or a 3D display device (a stereoscopic display device).

2. Related Art

A directional display device such as a 3D display device realizes display of different images (hereinafter, referred to as "directional display") in viewing directions by providing an image splitter such as a parallax barrier, a lenticular lens or an optical filter in front of a display panel for displaying an image, such as a liquid crystal panel and restricting emission directions of image light rays representing images. For example, JP-A-2005-181668 describes a directional display device using a parallax barrier and JP-A-8-331605 describes a directional display device using an optical filter.

In a directional display device as the known 3D display device, only when longitudinal and lateral directions of an image display surface of a display panel are arranged in a predetermined direction (hereinafter, referred to as a "reference direction" or a "vertical direction"), display of a 3D image (a three-dimensional image or a stereoscopic image) is possible and, when the longitudinal and lateral directions of the image display surface are arranged in an inverted direction (a direction rotated by 90 degrees, hereinafter, referred to as a "lateral direction") of the longitudinal direction arrangement, the display of the 3D image is impossible. In a directional display device as the known two-screen display device, separation of two screens in the longitudinal direction and the lateral direction is possible. However, there is a problem that a separation direction becomes a horizontal direction (lateral direction) in the longitudinal direction and becomes a vertical direction (longitudinal direction) in the lateral direction.

There is a need for a directional display device capable of simultaneously displaying different images in every viewing direction when viewed from a plurality of direction, similar to the case of the longitudinal direction, even in lateral direction arrangement as well as longitudinal direction arrangement.

For example, JP-A-2006-337496 and JP-A-2006-337844 disclose directional display devices which solve the above problem by a combination of a first polarization control unit and a second polarization control unit which is provided in front of the first polarization control unit. However, in the directional display devices disclosed in JP-A-2006-337496 and JP-A-2006-337844, since it is difficult to provide a pattern of a polarization control area of the second polarization control unit with high precision with respect to a pattern of a polarization control area of the first polarization control unit, separation capability of a plurality of images in the lateral direction arrangement is not sufficient.

SUMMARY

An advantage of some aspects of the invention is that it provides a directional display device capable of separating and displaying different images in every viewing directions with high precision when viewed from a plurality of direction, similar to the case of the longitudinal direction, even in lateral direction arrangement as well as longitudinal direction arrangement.

According to a first aspect of the invention, there is provided a directional display device which separates and displays a plurality of images displayed on an image display surface of a display panel in a plurality of different viewing direction, the directional display device including: a polarization control unit which is arranged in front of the display panel; a liquid crystal lens which is arranged in front of the polarization control unit; and a polarization plate which is arranged in front of the liquid crystal lens, wherein the polarization control unit has first and second polarization areas which change incident light rays to light rays having different polarization axes, the liquid crystal lens includes a lens layer including a plurality of lenses having a predetermined refractive index and a liquid crystal layer, an alignment state of the liquid crystal layer is changed so as to change the refractive index of the liquid crystal layer and change the refractive power of the liquid crystal lens, and the polarization axis of the light rays incident to the liquid crystal lens is changed, in a state in which the display panel is arranged in a first direction in which longitudinal and lateral directions of the image display surface are previously determined, the refractive power of the liquid crystal lens becomes invalid, and the polarization axis of the light rays incident from the polarization control unit is changed such that, among the light rays incident from the polarization control unit, light rays emitted from the first polarization area are shielded and light rays emitted from the second polarization area transmit through the polarization plate, and the plurality of images are separated in the plurality of viewing direction, and, in a state in which the display panel is arranged in a second direction in which the longitudinal and lateral directions of the image display surface are inverted from those of the first direction, the refractive power of the liquid crystal lens is set to a predetermined level, the polarization axis of the light rays incident from the polarization control unit is changed such that the light rays incident from the polarization control unit to the liquid crystal lens transmit through the polarization plate regardless of from which of the first polarization area and the second polarization area the light rays are emitted, and the plurality of images are separated in the plurality of viewing direction.

In the directional display device according to the first aspect, in the state in which the display panel is arranged in the first direction (longitudinal direction) among the light rays incident from the polarization control unit, the light rays emitted from the first polarization area are shielded by the polarization plate and the light rays emitted from the second polarization area transmit through the polarization plate such that the viewing directions of the plurality of images are restricted and thus the plurality of images can be separated in the plurality of viewing directions. In the state in which the display panel is arranged in the second direction (lateral direction), the viewing directions of the plurality of images are restricted by the refractive power of the liquid crystal lens and thus the plurality of images can be separated in the plurality of viewing directions. Accordingly, either of the first direction and the second direction, it is possible to separate and display different images in the viewing direction with high precision when viewed from the plurality of directions.

According to a second aspect of the invention, in the directional display device of the first aspect, the first polarization area and the second polarization area may be arranged in directions inclined from the longitudinal and lateral directions of the image display surface in a state in which the display panel is arranged in the first direction.

By configuring the first polarization area and the second polarization area as described above, the viewing directions of the plurality of images are restricted in the state in which the display panel is arranged in the first direction and thus the plurality of images can be separated in the plurality of viewing directions.

According to a third aspect of the invention, in the directional display device of the first or second aspect, the lens layer of the liquid crystal lens may be arranged such that the plurality of lenses having a semicylindrical shape have curved surfaces in the lateral direction in a state in which the display panel is arranged in the second direction.

By configuring the lens layer of the liquid crystal lens as described above, the viewing directions of the plurality of images are restricted in the state in which the display panel is arranged in the second direction and thus the plurality of images can be separated in the plurality of viewing directions.

According to a fourth aspect of the invention, in the directional display device of any one of the first to third aspects, the polarization control unit may be composed of a retardation plate having the first polarization area and the second polarization area.

According to a fifth aspect of the invention, in the directional display device of any one of the first to third aspects, the polarization control unit may be composed of a liquid crystal panel having the first polarization area and the second polarization area.

By configuring the polarization control unit according to the fourth or fifth aspect, in the state in which the display panel is arranged in the first direction, the light rays emitted from the first polarization area are shielded by the polarization plate and the light rays emitted from the second polarization area transmit through the polarization plate. In the state in which the display panel is arranged in the second direction, the light rays transmit through the polarization plate regardless of from which of the first polarization area and the second polarization area the light rays are emitted.

According to a sixth aspect of the invention, in the directional display device of any one of the first to fifth aspects, when the display panel is arranged in the first direction and the second direction, the refractive power of the liquid crystal lens may be set to an intermediate level smaller than the predetermined level such that the same image is displayed in the plurality of viewing directions.

By setting the refractive power of the liquid crystal lens to the intermediate level less than the predetermined level, it is possible to display the same image in the plurality of viewing directions.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in the following sequence.

A. Overview of Directional Display Device

B. Configuration and Operation of Longitudinal Direction Arrangement

C. Configuration and Operation of Lateral Direction Arrangement

D. Effect

E. Modified Example

A. OVERVIEW OF DIRECTIONAL DISPLAY DEVICE

Figure 1A:
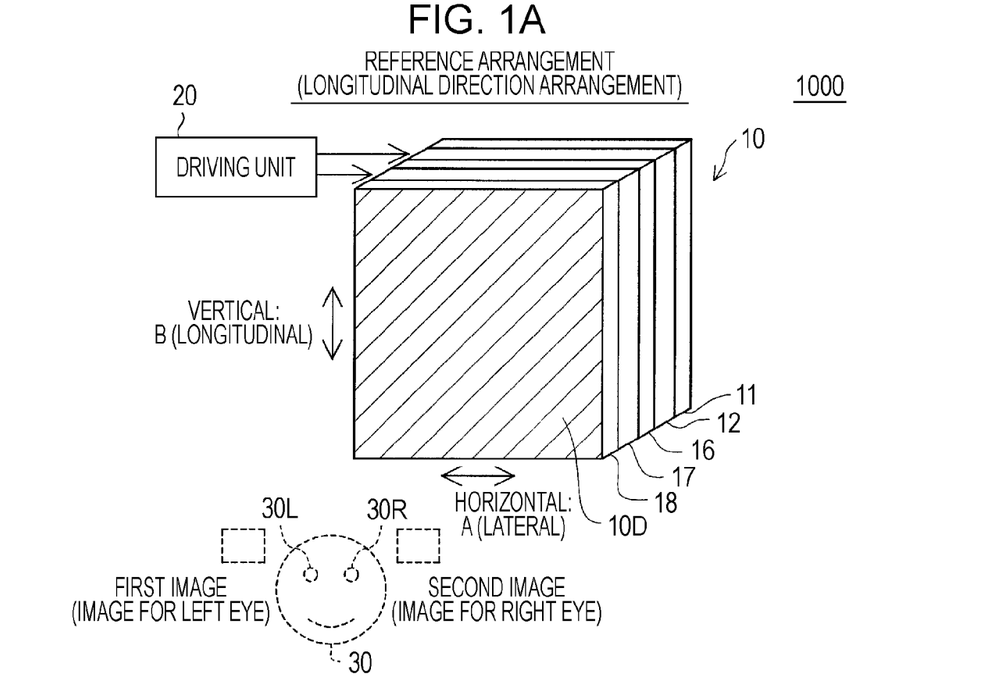
FIG. 1 is a schematic view showing a display unit and a driving unit configuring a directional display device according to an embodiment of the invention.
Figure 1B:
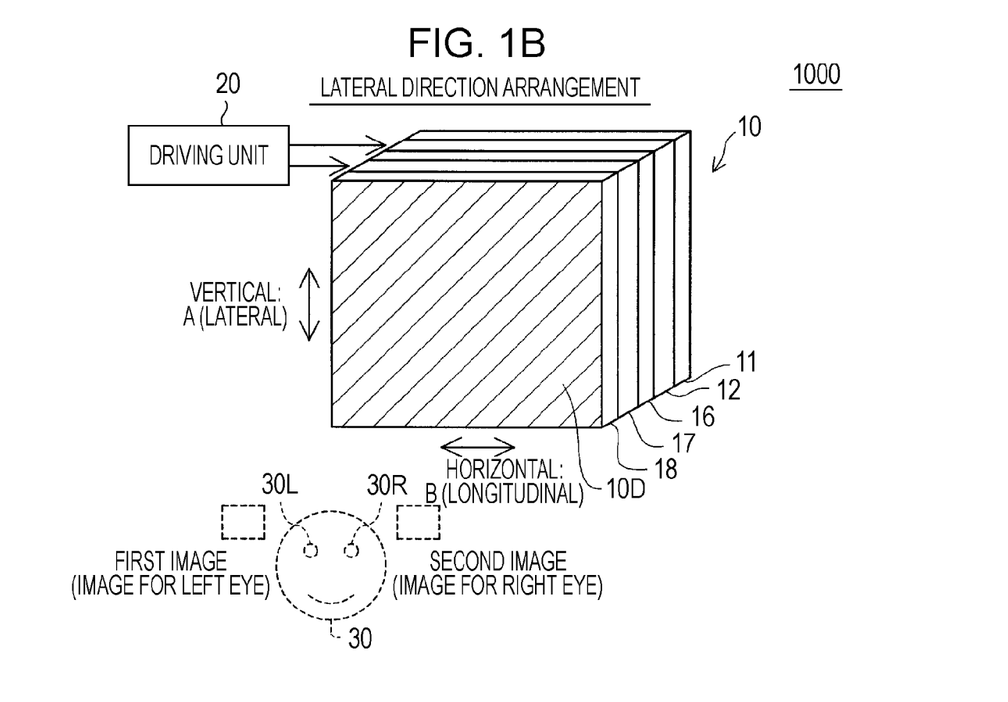

FIG. 1 is a schematic view showing a display unit and a driving unit configuring a directional display device according to an embodiment of the invention. The directional display device 1000 according to the present embodiment includes the display unit 10 and the driving unit 20 for driving the display unit 10. The directional display device 1000 is a 3D display device for separating two different images (a first image and a second image) displayed by the display unit 10 in a direction of a left eye 30L and a direction of a right eye 30R of a viewer 30 so as to be viewed by the viewer 30 when the display unit 10 is in a state of a reference arrangement (referred to as "longitudinal direction arrangement") as shown in FIG. 1A and when the display unit 10 is in a state of a lateral direction arrangement as shown in FIG. 1B. Hereinafter, the first image viewed by the left eye 30L of the viewer 30 is referred to as an "image for the left eye" and the second image viewed by the right eye 30R of the viewer 30 is referred to as an "image for the right eye".

Here, the "lateral direction arrangement" indicates a state in which, when a horizontal direction is defined as A (lateral direction) and a vertical direction is defined as B (longitudinal direction) in a surface 10D (hereinafter, referred to as an "image display surface") of the display unit 10 viewed from the viewer 30 side in the longitudinal direction arrangement which is the reference arrangement, the display unit 10 is rotated by 90 degrees such that the direction A is the vertical direction and the direction B is the horizontal direction.

Hereinafter, the configuration and the operation of the directional display device 1000 according to the present embodiment will be described with respect to the longitudinal direction arrangement and the lateral direction arrangement.

B. CONFIGURATION AND OPERATION OF LONGITUDINAL DIRECTION ARRANGEMENT

Figure 2:
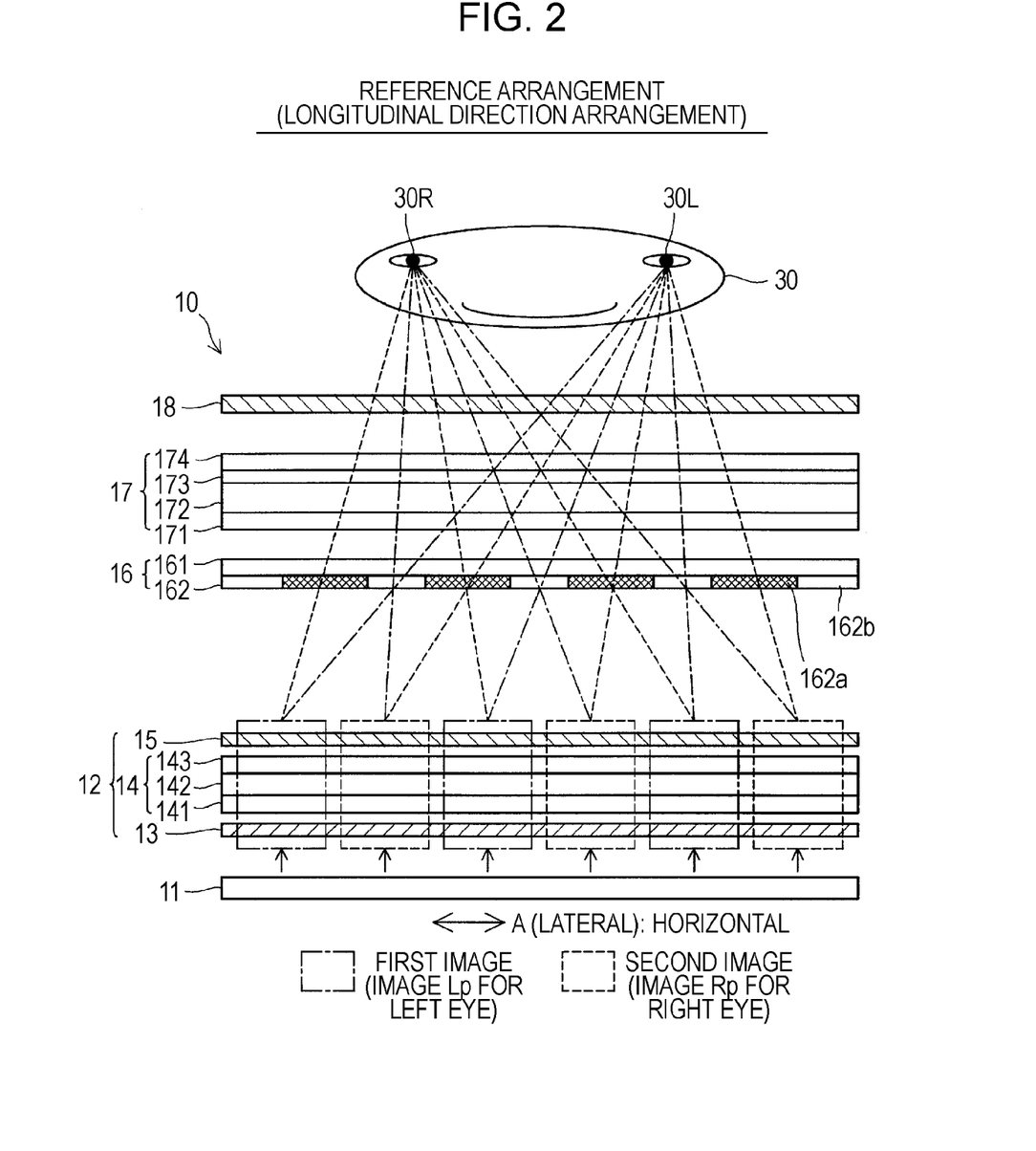
FIG. 2 is a schematic view showing the internal configuration of the display unit in longitudinal direction arrangement.

FIG. 2 is a schematic view showing the internal configuration of the display unit 10 in the longitudinal direction arrangement. As shown in FIG. 2, the display unit 10 includes a back light 11, a display panel 12 provided in front of the back light 11, a retardation film 16 provided in front of the display panel 12, a liquid crystal lens 17 provided in front of the retardation film 16, and a polarization plate 18 provided in front of the liquid crystal lens 17. The retardation film 16 corresponds to a polarization control unit of the present embodiment of the invention.

The display panel 12 is composed of a liquid crystal panel 14 and two polarization plates (an incident side polarization plate and an emission side polarization plate) 13 and 15 with the liquid crystal panel 14 interposed therebetween.

The incident side polarization plate 13 and the emission side polarization plate 15 transmit only light rays having the same polarization axis as a predetermined polarization axis, among incident light rays. For example, in the present embodiment, the incident side polarization plate 13 has a polarization axis of about 135° in a counterclockwise direction on the basis of the horizontal direction when viewed from the viewer 30 side. Hereinafter, unless specially described, it is considered that the angle of the polarization axis is the angle of the counterclockwise direction on the basis of the horizontal direction when viewed from the viewer 30 side. The emission side polarization plate 15 has a polarization axis of about 45°.

The liquid crystal panel 14 includes a liquid crystal layer 142 and two glass substrates 141 and 143 (an incident side glass substrate and an emission side glass substrate) with the liquid crystal layer 142 interposed therebetween. A pixel electrode (not shown) is provided on the incident side glass substrate 141 and a counter electrode (not shown) is provided on the emission side glass substrate 143. In the liquid crystal layer 142 interposed between the two glass substrates 141 and 143, the alignment of liquid crystal molecules varies according to a variation in driving signal (variation in voltage between the pixel electrode and the counter electrode) output from the driving unit 20 (see FIG. 1) so as to vary the polarization axis of the incident light rays. The driving signal output from the driving unit 20 is generated on the basis of an image signal representing a display image. For example, in the present embodiment, as liquid crystal configuring the liquid crystal layer 142, twisted nematic (TN) liquid crystal is used. In this case, an alignment direction of the liquid crystal molecules varies according to an applied voltage between the electrodes of pixels (areas denoted by dotted lines or areas denoted by dashed-dotted lines in the drawing), the light rays are emitted by changing the polarization axis of the incident light rays by about 90° in pixels in which a liquid crystal portion corresponding to a low applied voltage is in an off state, and the light rays are emitted without changing the polarization axis of the incident light rays in pixels in which a liquid crystal portion corresponding to a high applied voltage is in an on state.

Figure 3:
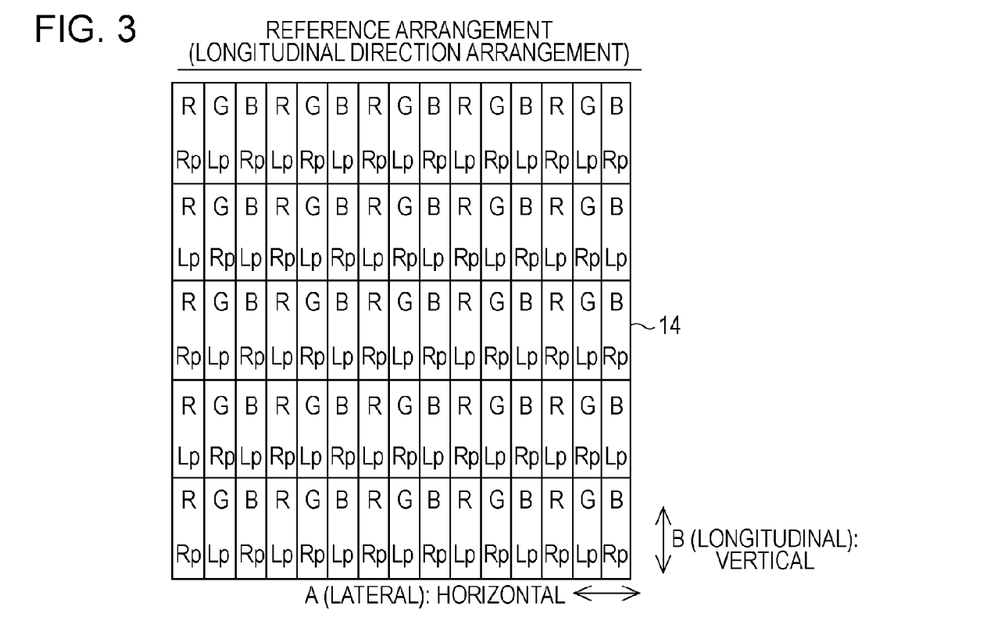
FIG. 3 is a schematic view showing a state in which a liquid crystal panel is viewed from a viewer side in the longitudinal direction arrangement.

FIG. 3 is a schematic view showing a state in which the liquid crystal panel 14 is viewed from the viewer 30 side in the longitudinal direction arrangement. As shown in FIG. 3, in the liquid crystal panel 14, a plurality of pixels are arranged in a matrix in the A direction (horizontal direction) and the B direction (vertical direction). As described above, the pixels emit the light rays by changing the polarization axis of the incident light rays from the incident side polarization plate 13 according to the driving signal received from the driving unit 20 (see FIG. 1). At this time, the emission side polarization plate 15 transmits the light rays having the same polarization axis as the polarization axis of the emission side polarization plate 15 of the incident light rays from the liquid crystal panel 14. As a result, the light rays emitted from the display panel 12 have the same polarization axis as the polarization axis of the emission side polarization plate 15, are the light rays of which the brightness varies according to the driving signal generated on the basis of the image signal, and become image light rays representing the image represented by the image signal.

Pixels of the image Lp (first image) for the left eye and pixels of image Rp (second image) for the right eye are allocated to the pixels of the liquid crystal panel 14 in the longitudinal direction arrangement so as to be arranged in a checkerwise manner (stepwise manner). Color filters (not shown in FIG. 2) of red (R), green (G) and blue (B) arranged in a stripe shape in the B direction are provided in the pixels of the liquid crystal panel 14.

The retardation film 16 shown in FIG. 2 includes a glass plate 161 and a retardation layer 162 provided on the surface of the glass plate 161. The retardation layer 162 is composed of polarization control areas 162a and 162b having two different polarization axes.

The first polarization control areas 162a are provided on lines (dotted lines) for connecting pixels (denoted by dashed-dotted frames) corresponding to the image Lp for the left eye of the liquid crystal panel 14 and the right eye 30R of the viewer 30 and are provided on lines (dotted lines) for connecting pixels (denoted by dotted frames) corresponding to the image Rp for the right eye and the left eye 30L of the viewer 30. The second polarization control areas 162b are provided on lines (dashed-dotted lines) for connecting pixels corresponding to the image Lp for the left eye and the left eye 30L of the viewer 30 and are provided on lines (dashed-dotted lines) for connecting pixels corresponding to the image Rp for the right eye and the right eye 30R of the viewer 30.

Figure 4:
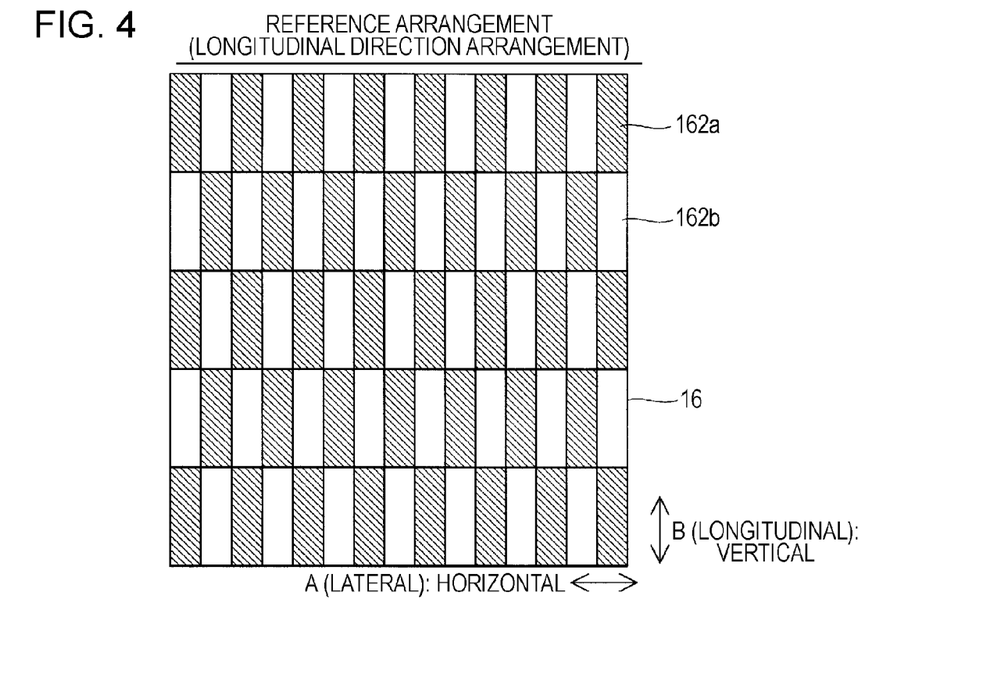
FIG. 4 is a schematic view showing a state in which a retardation layer of a retardation film is viewed from the viewer side in the longitudinal direction arrangement.

FIG. 4 is a schematic view showing a state in which the retardation layer 162 of the retardation film 16 is viewed from the viewer 30 side in the longitudinal direction arrangement. As shown in FIG. 3, since the pixels of the image Lp for the left eye and the pixels of the image Rp for the right eye are allocated to the pixels of the liquid crystal panel 14 in the checkerwise manner, the two polarization control areas 162a and 162b are arranged in the checkerwise manner (stepwise manner) as shown in FIG. 4.

The polarization control areas 162a and 162b of the retardation layer 162 have a function for changing the polarization axis of the transmitted light rays to polarization axes which are linearly symmetrical to the polarization axes thereof. In more detail, the polarization control areas 162a and 162b of the retardation layer 162 have a function of giving a phase difference of $\lambda/2$ to the incident light rays, and the light rays having a polarization axis of an angle $\alpha$ with respect to the polarization axes thereof are changed to the light rays having a polarization axis of an angle $-\alpha$ with respect to the polarization axes thereof so as to be emitted. For example, in the present embodiment, the first polarization control areas 162a have a polarization axis of about 75° and the second polarization control areas 162b have a polarization axis of about 15°.

The liquid crystal lens 17 operates in two states, that is, a state with refractive power and a state without refractive power, according to the driving signal received from the driving unit 20.

Figure 5A:
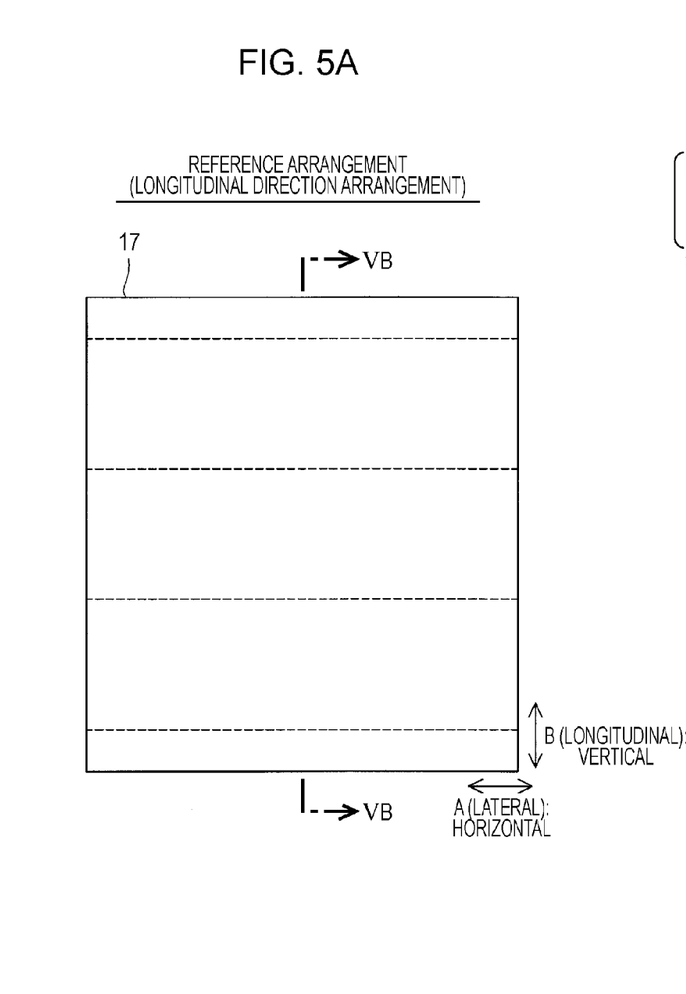
FIG. 5 is a schematic view showing a liquid crystal lens in the longitudinal direction arrangement.
Figure 5B:
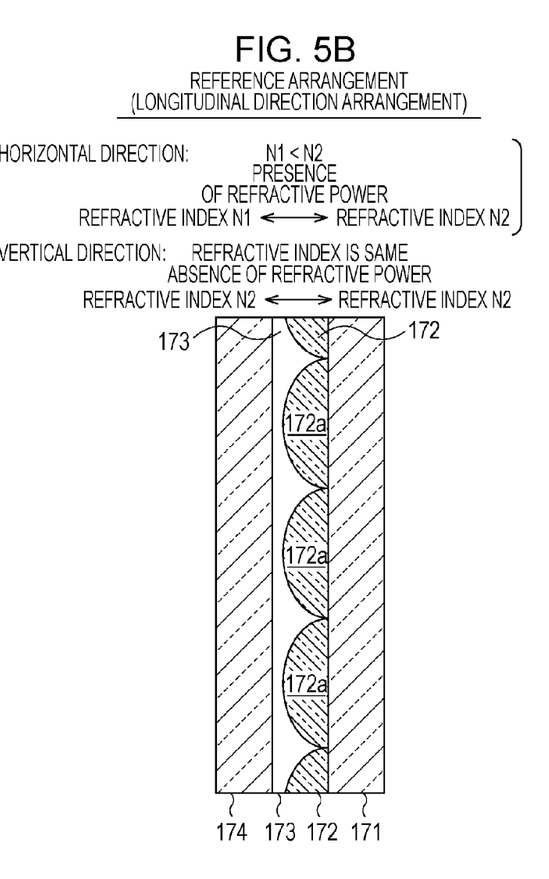

FIG. 5 is a schematic view showing the liquid crystal lens 17 in the longitudinal direction arrangement. FIG. 5A is a schematic view showing a state in which the liquid crystal lens 17 is viewed from the viewer 30 side and FIG. 5B is a schematic view showing a state in which the liquid crystal lens 17 is viewed from a side taken along line V-V of FIG. 5A. As shown in FIG. 5, the liquid crystal lens 17 includes an incident side glass plate 171, an emission side glass plate 174, a lens member 172 and a liquid crystal layer 173. The two glass plates 171 and 174 include respective transparent electrodes (not shown) formed on the surfaces thereof and wholly have a light transmission property.

The lens member 172 is made of a light transmissive material. As the light transmissive material, a synthetic resin such as urethane acrylate, which is ultraviolet curing resin, or a material having a substantially constant refractive index, such as glass, may be used. The lens member 172 is a lenticular lens in which a plurality of cylindrical lenses 172a are arranged in the B direction as shown in FIG. 5B.

The liquid crystal layer 173 is made of liquid crystal filled between the lens member 172 and the emission side glass plate 174. The alignment direction of the liquid crystal varies according to the applied voltage between transparent electrodes (not shown) of the two glass plates 171 and 174 and thus the refractive index varies. In more detail, for example, if the applied voltage is 0 V, the liquid crystal layer 173 is in an off state and the refractive index becomes N2 and, if the applied voltage is a predetermined voltage V1, the liquid crystal layer 173 is in an on state and the refractive index becomes N1 (<N2). Here, the refractive index N2 when the applied voltage is 0 V becomes equal to the refractive index N2 of the light transmissive material configuring the lens member 172. As the liquid crystal configuring the liquid crystal layer 173, for example, terphenyl liquid crystal or tolan liquid crystal may be used. Among the plural types of liquid crystal, liquid crystal having optical characteristics including the refractive indexes N1 and N2 within the variation range of the refractive index. The voltage V1 when the refractive index N1 may be set by experiments.

In the longitudinal direction arrangement, in the liquid crystal lens 17, the liquid crystal layer 173 is in an off state by setting the voltage applied between the transparent electrodes by the driving unit 20 to 0 V, the refractive index becomes N2, and thus the refractive power of the lens member 172 (the refractive index of the liquid crystal lens 17 becomes invalid. In contrast, in the lateral direction arrangement, the liquid crystal layer 173 is in an off state by setting the voltage applied between the transparent electrodes by the driving unit 20 to V1, the refractive index becomes N1, and thus the refractive power of the lens member 172 (the refractive index of the liquid crystal lens 17 becomes valid.

The polarization plate 18 of FIG. 2 transmits only the linearly polarized light rays having the same polarization axis as the predetermined polarization axis among the incident light rays, similar to the incident side polarization plate 13 and the emission side polarization plate 15 of the display panel 12. In the present embodiment, the polarization plate 18 has the polarization axis of about 45°, which is equal to that of the emission side polarization plate 15 of the display panel 12.

Figure 6:
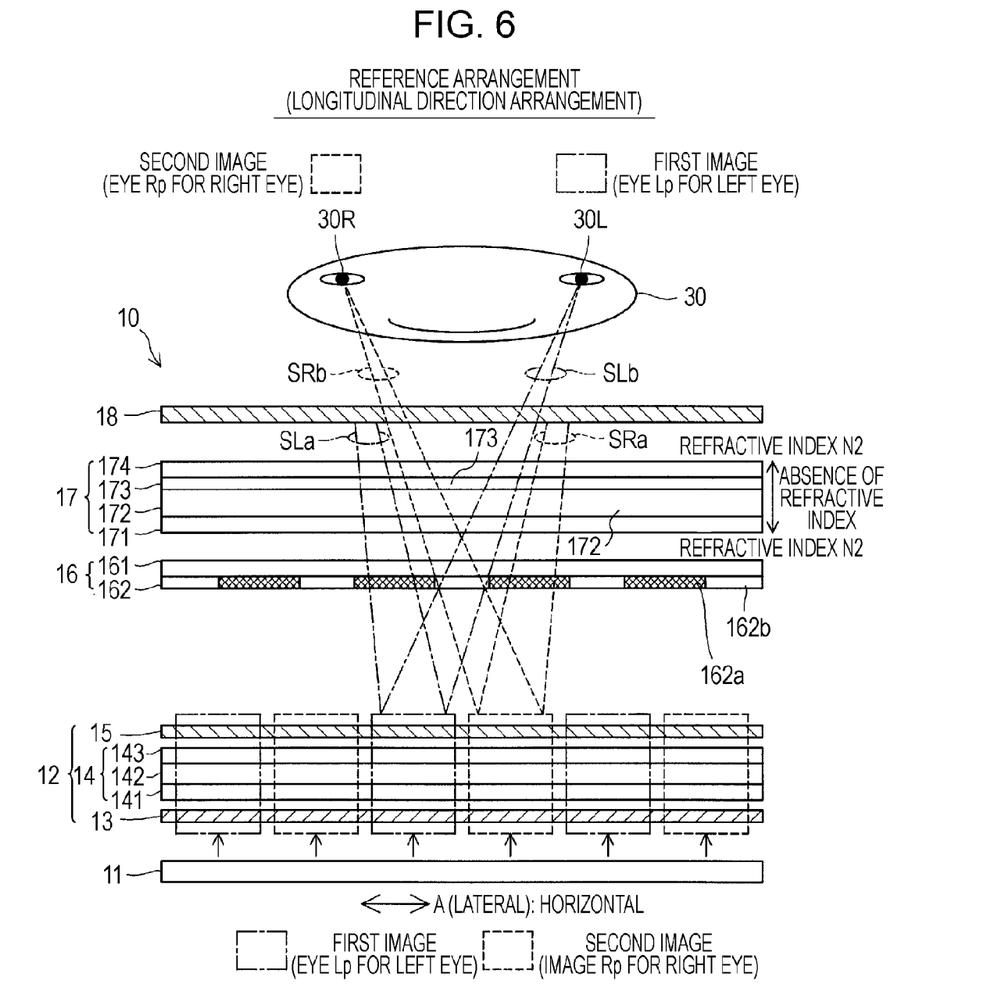
FIG. 6 is a schematic view showing image light rays which transmit through the display unit in the longitudinal direction arrangement.
Figure 7A:
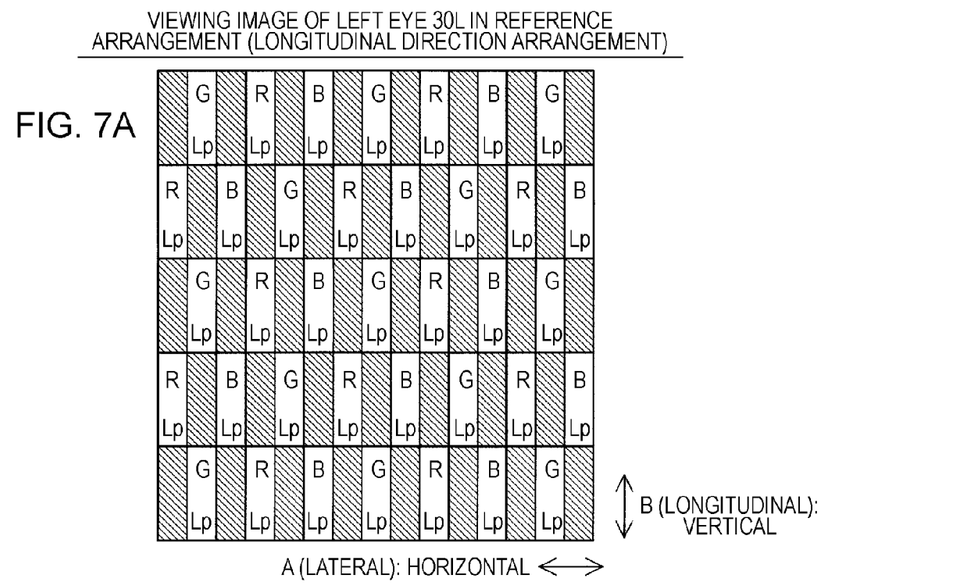
FIG. 7 is a schematic view showing an image which is viewed by the left eye of the viewer and an image which is viewed by the right eye of the viewer, in the longitudinal direction arrangement.
Figure 7B:
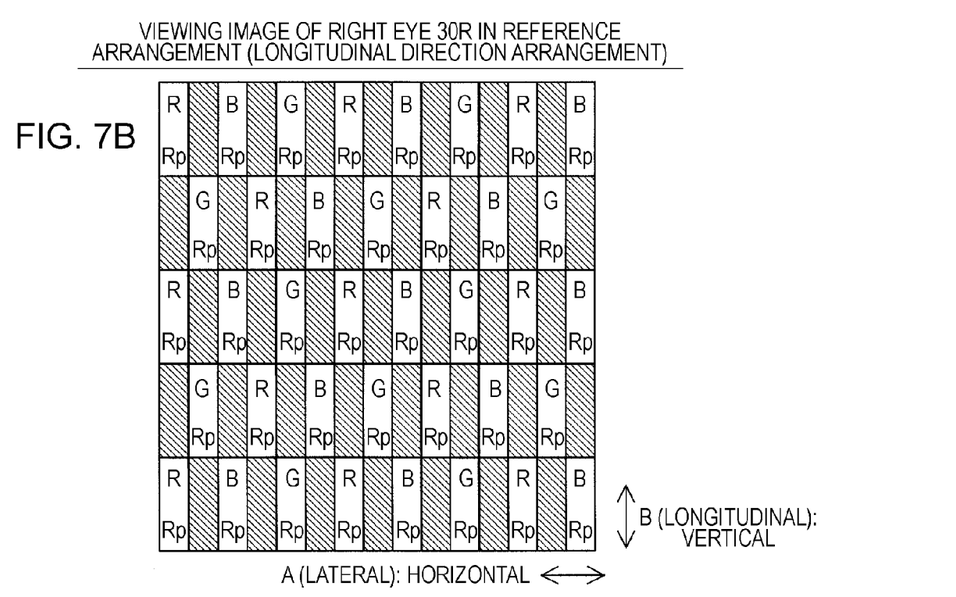

FIG. 6 is a schematic view showing image light rays which transmit through the display unit 10 in the longitudinal direction arrangement. Among the image light rays emitted from the pixel of the image Lp for the left eye, the light rays SLb which transmit through second polarization control area 162b of the retardation film 16 and travel toward the left eye 30L of the viewer 30 transmit through the polarization plate 18 to be made incident to the left eye 30L. Similarly, among the image light rays emitted from the pixel of the image Rp for the right eye, the light rays SRb which transmit through second polarization control area 162b of the retardation film 16 and travel toward the right eye 30R of the viewer 30 transmit through the polarization plate 18 to be made incident to the right eye 30R. Meanwhile, as described below, among the image light rays emitted from the pixel of the image Lp for the left eye, the light rays SLa which transmit through first polarization control area 162a and travel toward the right eye 30R of the viewer 30 is shielded by the polarization plate 18 so as not to reach the right eye 30R of the viewer 30. Similarly, among the image light rays emitted from the pixel of the image Rp for the right eye, the light rays SRa which transmit through first polarization control area 162a and travel toward the left eye 30L of the viewer 30 is shielded by the polarization plate 18 so as not to reach the left eye 30L of the viewer 30. That is, in the longitudinal direction arrangement, the light rays transmitting through the first polarization control area 162a of the retardation film 16 is shielded and only the light rays transmitting through the second polarization control area 162 reach the viewer 30. Accordingly, as shown in FIG. 7, only the image Lp for the left eye is viewed by the left eye 30L of the viewer and only the image Rp for the right eye is viewed by the right eye 30R of the viewer 30. FIG. 7 is a schematic view showing an image which is viewed by the left eye 30L of the viewer 30 and an image which is viewed by the right eye 30R of the viewer 30, in the longitudinal direction arrangement.

Figure 8:
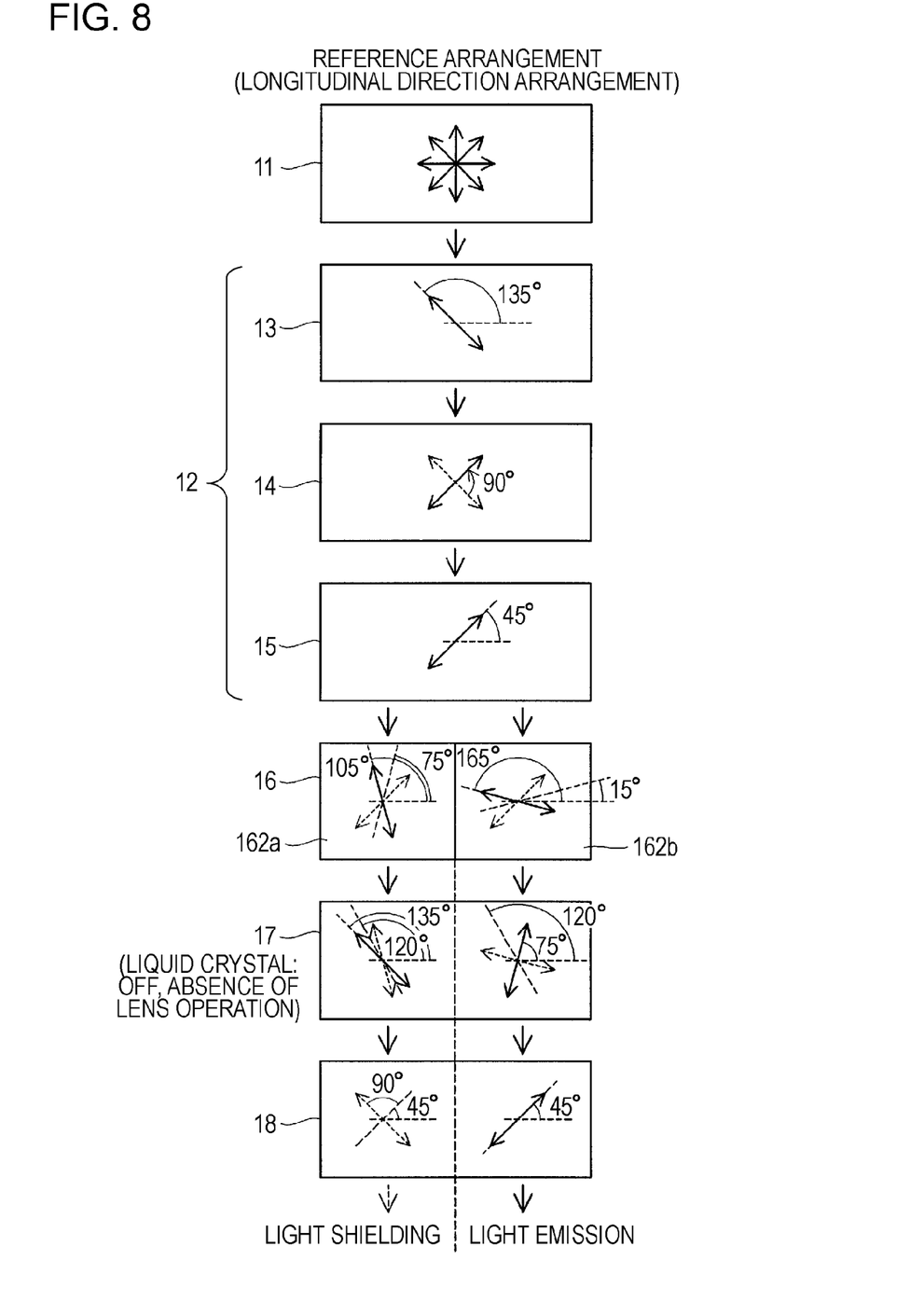
FIG. 8 is a view showing the reason why light rays transmitting through a first polarization control area of the retardation film are shielded and only light rays transmitting through a second polarization control area reach the viewer in the longitudinal direction arrangement.

FIG. 8 is a view showing the reason why the light rays transmitting through the first polarization control area 162a of the retardation film 16 is shielded and only the light rays transmitting through the second polarization control area 162b reach the viewer 30 in the longitudinal direction arrangement. In FIG. 8, a dotted line indicates the angle of the polarization axis of the two polarization plates 13 and 15 of the display panel 12, the retardation plate 16, the liquid crystal lens 17 and the polarization plate 18. A dotted line attached with an arrow indicates the angle of the polarization axis of the incident light rays and a solid line attached with an arrow denotes the angle of the polarization axis of the transmitted light rays.

Among the light rays which are emitted from the back light 11 and have random polarization axes, only the light rays having the same polarization axis as the polarization axis of about 135° of the incident side polarization plate 13 transmit through the incident side polarization plate 13. The light rays emitted from the incident side polarization plate 13 are made incident to the liquid crystal panel 14 and are emitted therefrom in a state in which the polarization axis thereof is rotated by 90°. That is, the light rays transmitting through the liquid crystal panel 14 have the polarization axis of about 45°. The light rays emitted from the liquid crystal panel 14 transmit through the emission side polarization plate 15 having a polarization axis of about 45°. The light rays transmitting through the emission side polarization plate 15 are made incident to the first polarization control area 162a or the second polarization control area 162b of the retardation film 16.

The light rays incident to the first polarization control area 162a and the second polarization control area 162b transmit while the polarization axes are changed to the polarization axes which are linearly symmetrical with respect to the respective polarization axes. In more detail, as described above, since the polarization axis of the first polarization control area 162a is about 75° and the polarization axis of the light rays incident to the first polarization control area 162a is about 45°, the polarization axis of the light rays emitted from the first polarization control area 162a becomes about 105°. In contrast, since the polarization axis of the second polarization control area 162b is about 15° and the polarization axis of the light rays incident to the second polarization control area 162b is about 45°, the polarization axis of the light rays emitted from the second polarization control area becomes about 165°.

The light rays emitted from the retardation film 16 transmit through the liquid crystal lens 17. At this time, in the liquid crystal lens 17, since the voltage applied between the transparent electrodes is 0 V and the liquid crystal layer 173 is in the off state, the liquid crystal layer 173 of the liquid crystal lens 17 performs a function for changing the polarization axis of the incident light rays to the light rays having the polarization axis which is linearly symmetrical with respect to the predetermined polarization axis. In the present embodiment, the liquid crystal layer 173 has the polarization axis of about 120°. Accordingly, the light rays incident to the liquid crystal lens 17 transmit through the liquid crystal lens 17 while the polarization axis thereof is changed to the polarization axis which is linearly symmetrical with respect to the polarization axis of 120°. In more detail, the light rays emitted from the first polarization control area 162a are emitted from the liquid crystal lens 17 in a state in which the polarization axis thereof becomes about 135° and the light rays emitted from the second polarization control area 162b are emitted in a state in which the polarization axis thereof becomes about 75°.

Among the light rays emitted from the liquid crystal lens 17, the light rays which transmit through the first polarization control area 162a and have the polarization axis of about 135° have the polarization axis which is perpendicular to the polarization axis of about 45° of the polarization plate 18 and thus are shielded by the polarization plate 18. As shown in FIG. 2, since the first polarization control area 162a of the retardation film 16 is provided on the line for connecting the pixel of the image Lp for the left eye of the display panel 12 and the right eye 30R of the viewer 30, it is possible to suppress the image light rays emitted from the pixels of the image Lp for the left eye from being incident to the right eye 30R. Since the first polarization control area 162a of the retardation film 16 is provided on the line for connecting the pixel of the image Rp for the right eye of the display panel 12 and the left eye 30L of the viewer 30, it is possible to suppress the image light rays emitted from the pixels of the image Rp for the right eye from being incident to the left eye 30L.

Among the light rays emitted from the liquid crystal lens 17, the light rays which transmit through the second polarization control area 162b and have the polarization axis of about 75° have the polarization axis which is not perpendicular to the polarization axis of about 45° of the polarization plate 18 and thus are changed to the light having the polarization axis of about 45° by the polarization plate 18 so as to be emitted from the polarization plate 18. As shown in FIG. 2, since the second polarization control area 162b of the retardation film 16 is provided on the line for connecting the pixel of the image Lp for the left eye of the display panel 12 and the left eye 30L of the viewer 30, it is possible to make the image light rays emitted from the pixels of the image Lp for the left eye incident to the left eye 30L. Since the second polarization control area 162b of the retardation film 16 is provided on the line for connecting the pixel of the image Rp for the right eye of the display panel 12 and the right eye 30R of the viewer 30, it is possible to make the image light rays emitted from the pixels of the image Rp for the right eye incident to the right eye 30R.

As described above, in the longitudinal direction arrangement, only the image light rays representing the image Lp for the left eye are made incident to the left eye 30L of the viewer 30 and only the image light rays representing the image Rp for the right eye are made incident to the right eye 30R of the viewer 30 such that only the image Lp for the left eye is viewed by the left eye 30L of the viewer 30 and only the image Rp for the right eye is viewed by the right eye 30R. As a result, the viewer 30 can view the 3D image.

C. CONFIGURATION AND OPERATION OF LATERAL DIRECTION ARRANGEMENT

Figure 9:
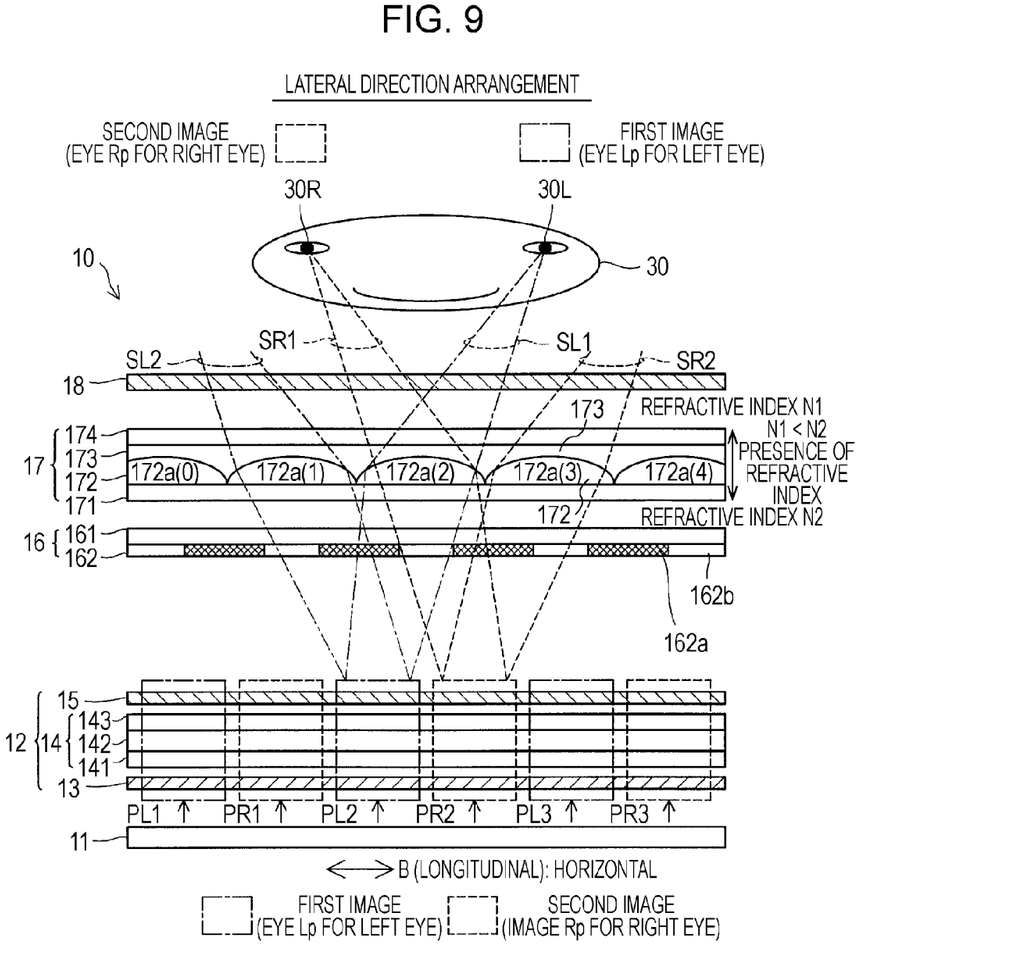
FIG. 9 is a schematic view showing image light rays transmitting through the display unit in lateral direction arrangement.

FIG. 9 is a schematic view showing the image light rays transmitting through the display unit 10 in lateral direction arrangement.

Figure 10:
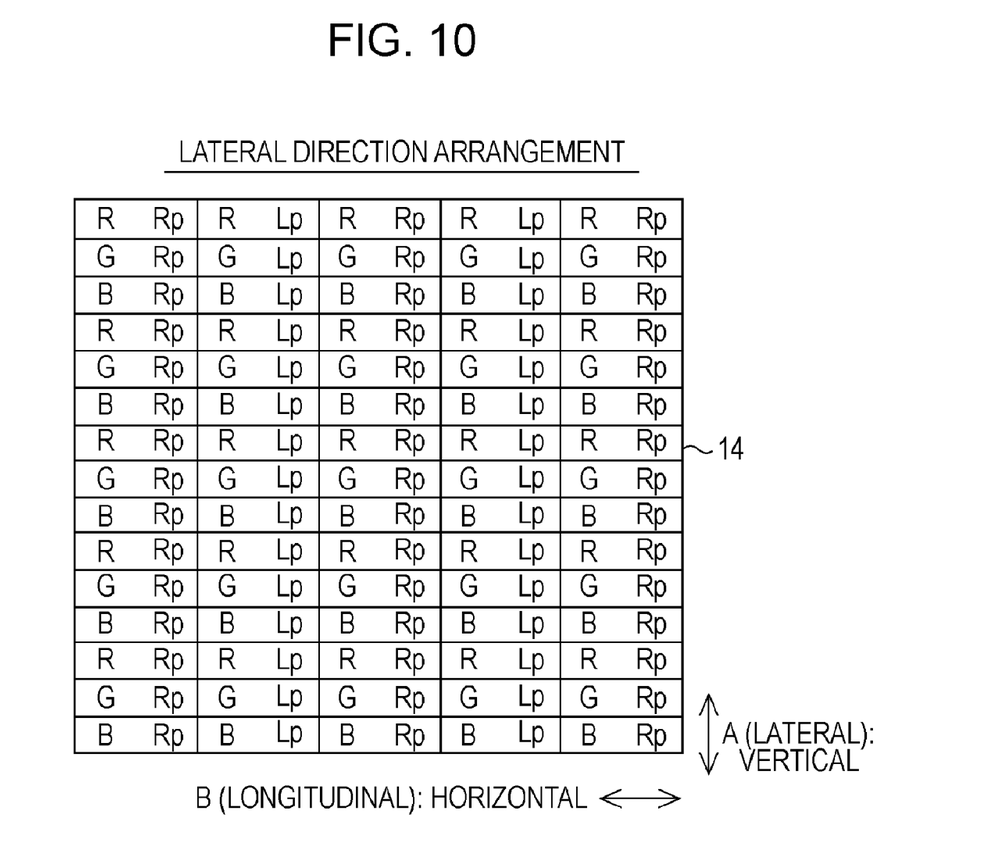
FIG. 10 is a schematic view showing a state in which the liquid crystal panel is viewed from the viewer side in the lateral direction arrangement.

Here, in the lateral direction arrangement, as shown in FIG. 10, the pixel of the image Lp (first image) for the left eye and the pixel of the image Rp (second image) for the right eye are allocated to the pixels of the liquid crystal panel 14 in a state different from that of the longitudinal direction arrangement shown in FIG. 2.

FIG. 10 is a schematic view showing a state in which the liquid crystal panel 14 is viewed from the viewer 30 side in the lateral direction arrangement. As shown in FIG. 10, in the lateral direction arrangement, the pixel of the image Lp (first image) for the left eye and the pixel of the image Rp (second image) for the right eye are alternately arranged in every pixel columns arranged in the A direction (vertical direction) and are allocated to the pixels of the liquid crystal panel 14 in a stripe manner.

In the lateral direction arrangement, as described with reference to FIG. 5 in the description of the longitudinal direction arrangement, the liquid crystal lens 17 is driven by the driving unit 20 (FIG. 1) by setting the refractive index N1 (<N2) of the liquid crystal layer 173 with respect to the refractive index N2 of the light transmissive the lens member 172 such that the refractive power becomes valid. The cylindrical lenses 172a of the lens member 172 functioning as the lenticular lens are arranged so as to correspond to a set of a column of the pixels of the image Lp for the left eye and a row of pixels of the image Rp for the right eye arranged at the left side thereof when viewed from the viewer 30 side, similar to the 3D display device using the lenticular lens as the image splitter. For example, a cylindrical lens 172a(2) of the central portion of FIG. 9 corresponds to two pixels PL2 and PR2, a cylindrical lens 172a(1) of the left side corresponds to two pixels PL1 and PR1 of the left side, and a cylindrical lens 172a(3) of the right side corresponds to two pixels PL3 and PR3 of the right side.

The configuration other than the above-described configuration is equal to the configuration in the longitudinal direction arrangement except that the arrangement directions are different from each other and the description thereof will be omitted.

Figure 11A:
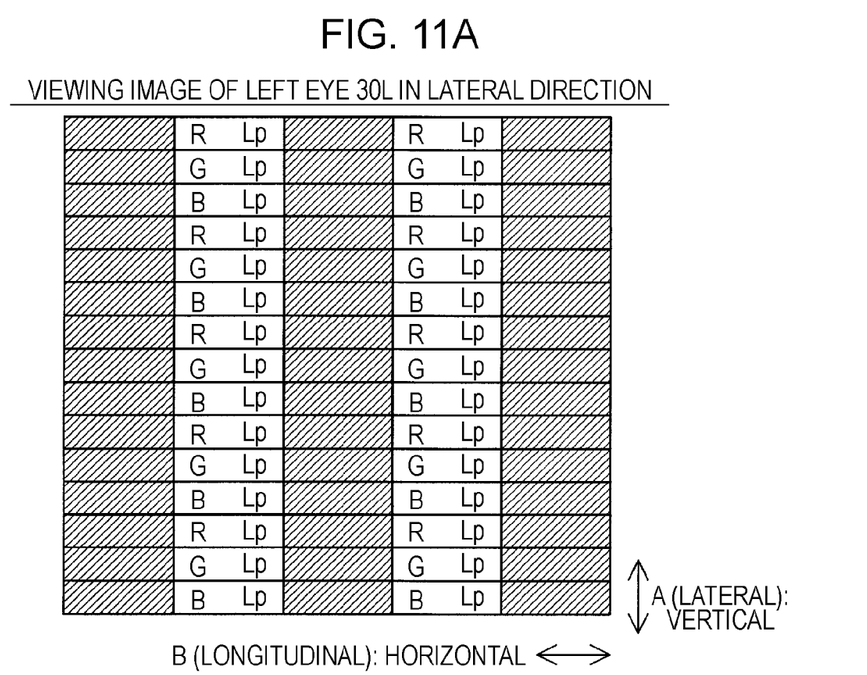
FIG. 11 is a schematic view showing an image which is viewed by the left eye of the viewer and an image which is viewed by the right eye of the viewer, in the lateral direction arrangement.
Figure 11B:
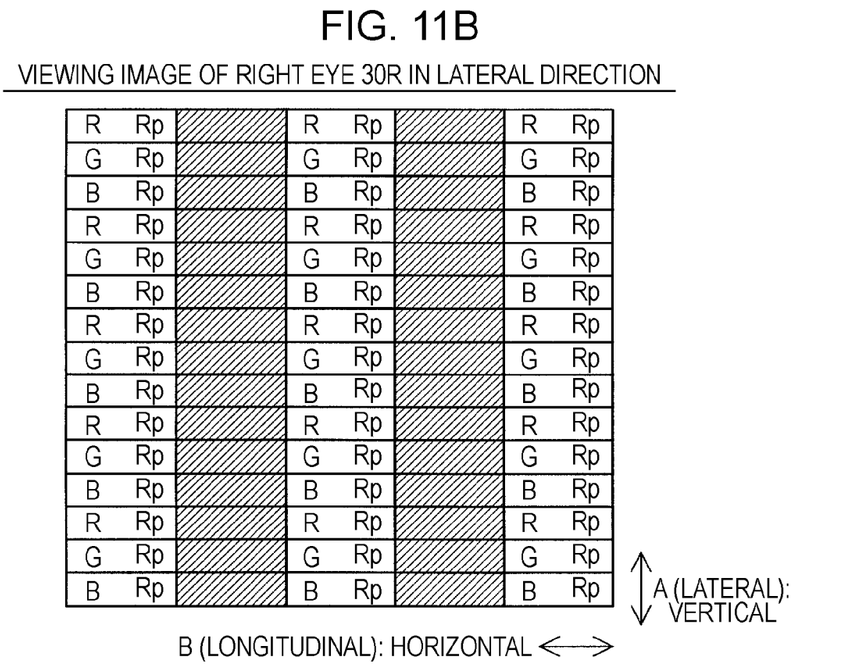

In the lateral direction arrangement, the image light rays emitted from the pixels of the image Lp for the left eye and the image light rays emitted from the pixels of the image Rp of the right eye transmit through the polarization plate 18, regardless of to which of the first polarization control area 162a and the second polarization control area 162b of the retardation film 16 the light rays are made incident, as described below. For example, as shown in FIG. 9, among the image light rays emitted from the pixel PL2 of the image Lp for the left eye, the light rays SL1 transmitting through the cylindrical lens 172a(2) corresponding thereto are guided so as to form the image at the position of the left eye 30L of the viewer 30 by the refractive power of the cylindrical lens 172a. Similarly, among the image light rays emitted from the pixel PR2 of the image Rp for the right eye, the light rays SR1 transmitting through the cylindrical lens 172a(2) corresponding thereto are guided so as to form the image at the position of the right eye 30R of the viewer 30 by the refractive power of the cylindrical lens 172a(2). That is, the cylindrical lenses 172a are configured such that the image light rays emitted from the pixels corresponding thereto form the image at the position of the eye of the viewer. In contrast, among the image light rays emitted from the pixel PL2 of the image Lp for the left eye, the light rays SL2 transmitting through the cylindrical lens 172a(1) which does not correspond thereto are not guided to the position of the eye of the viewer 30. Similarly, among the image light rays emitted from the pixel PR2 of the image Rp for the right eye, the light rays SR2 transmitting through the cylindrical lens 172a(3) which does not correspond thereto are not guided to the position of the eye of the viewer 30. The same is true in the light rays emitted from the other pixels. Accordingly, as shown in FIG. 11, only the image Lp for the left eye is viewed by the left eye 30L of the viewer 30 and only the image Rp for the right eye is viewed by the right eye 30R of the viewer 30. FIG. 11 is a schematic view showing an image which is viewed by the left eye 30L of the viewer 30 and an image which is viewed by the right eye 30R of the viewer, in the lateral direction arrangement.

Figure 12:
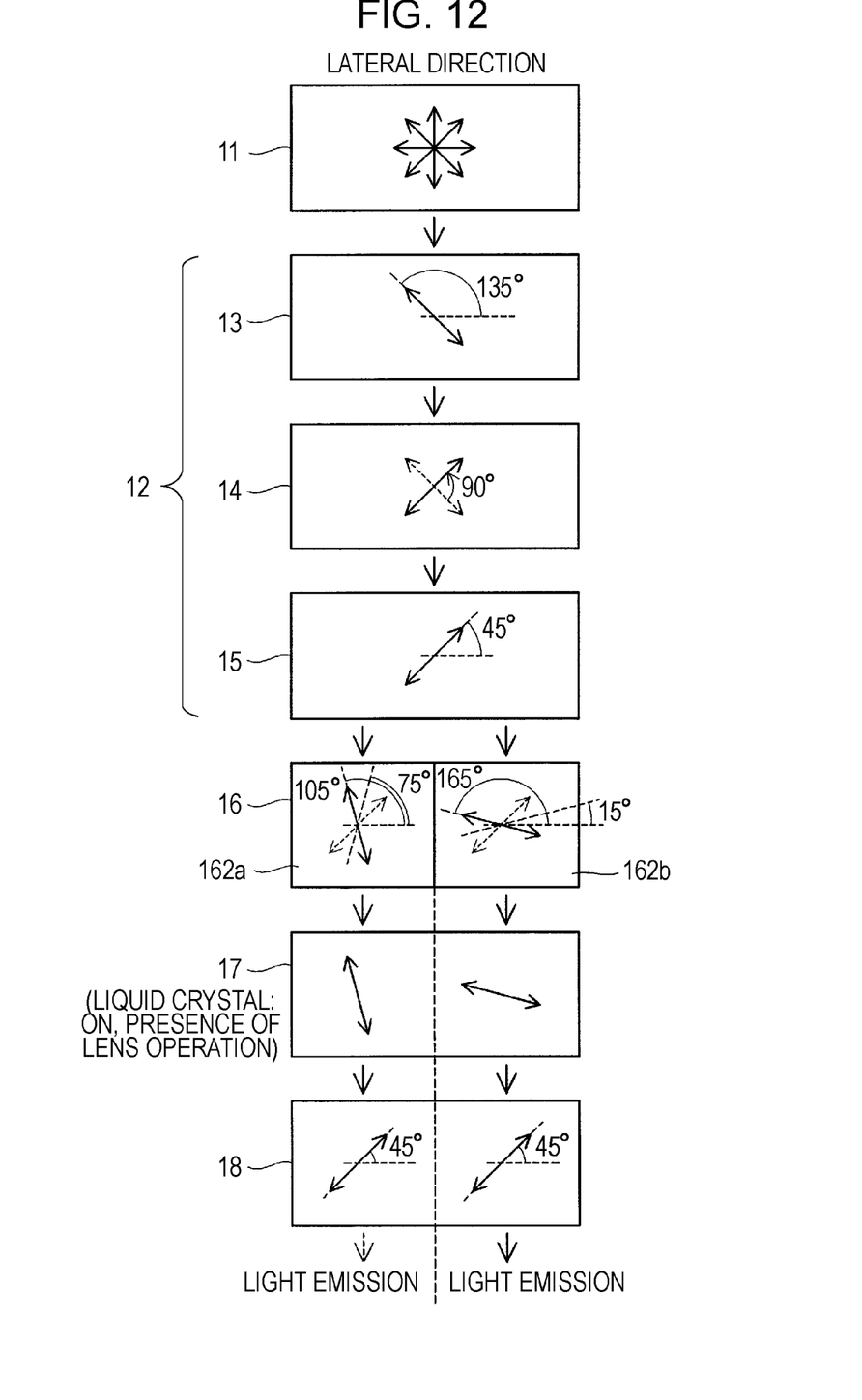
FIG. 12 is a view showing the reason why light rays emitted from pixels transmit through a polarization plate, regardless of through which of the first polarization control area and the second polarization control area of the retardation film the light rays transmit, in the lateral direction arrangement.

FIG. 12 is a view showing the reason why the light rays emitted from the pixels transmit through the polarization plate 18, regardless of through which of the first polarization control area 162a and the second polarization control area 162b of the retardation film 16 the light rays transmit, in the lateral direction arrangement. In FIG. 12, a dotted line indicates the angle of the polarization axis of the two polarization plates 13 and 15 of the display panel 12, the retardation plate 16, the liquid crystal lens 17 and the polarization plate 18. A dotted line attached with an arrow indicates the angle of the polarization axis of the incident light rays and a solid line attached with an arrow denotes the angle of the polarization axis of the transmitted light rays.

Similar to the longitudinal direction arrangement, among the light rays transmitting through the display panel 12 and the retardation film 16, the light rays transmitting through the first polarization control area 162a of the retardation film 16 become the light rays having a polarization axis of about 105° and the light rays transmitting through the second polarization control area 162b of the retardation film 16 become the light rays having a polarization axis of about 165°.

The light rays emitted from the retardation film 16 transmit through the liquid crystal lens 17. At this time, in the liquid crystal lens 17, since the voltage applied between the transparent electrodes is V1 and the liquid crystal layer 173 is in the on state, the liquid crystal layer 173 of the liquid crystal lens 17 does not perform a function for changing the polarization axis of the incident light rays in the off state and transmit the incident light rays without changing the polarization axis of the incident light rays. In more detail, the light rays emitted from the first polarization control area 162a are emitted from the liquid crystal lens 17 in the polarization axis of about 105° without change and the light rays emitted from the second polarization control area 162b are emitted from the liquid crystal lens 17 in the polarization axis of about 165° without change.

Among the light rays emitted from the liquid crystal lens 17, the light rays which transmit through the first polarization control area 162a and have the polarization axis of about 105° have the polarization axis which is not perpendicular to the polarization axis of about 45° of the polarization plate 18 and thus are changed to the light rays having the polarization axis of about 45° so as to be emitted without being shielded by the polarization plate 18. The light rays which transmit through the second polarization control area 162b and have the polarization axis of about 165° have the polarization axis which is not perpendicular to the polarization axis of about 45° of the polarization plate 18 and thus are changed to the light rays having the polarization axis of about 45° so as to be emitted without being shielded by the polarization plate 18.

Accordingly, the image light rays emitted from the pixel of the image Lp for the left eye and the image light rays emitted from the pixel of the image Rp for the right eye can transmit through the polarization plate 18, regardless of through which of the first polarization control area 162a and the second polarization control area 162b of the retardation film 16 the light rays transmit. Accordingly, among the image light rays emitted from the pixels of the image Lp for the left eye, the light rays transmitting through the cylindrical lenses 172a corresponding thereto are guided so as to form the image at the position of the left eye 30L of the viewer 30 and thus only the image Lp for the left eye is viewed by the left eye 30L of the viewer 30. Among the image light rays emitted from the pixels of the image Rp for the right eye, the light rays transmitting through the cylindrical lenses 172a corresponding thereto are guided so as to form the image at the position of the right eye 30R of the viewer 30 and thus only the image Rp for the right eye is viewed by the right eye 30R of the viewer 30.

As described above, even in the lateral direction arrangement, only the image light rays representing the image Lp for the left eye are made incident to the left eye 30L of the viewer 30 and only the image light rays representing the image Rp for the right eye are made incident to the right eye 30R of the viewer 30 such that only the image Lp for the left eye is viewed by the left eye 30L of the viewer 30 and only the image Rp for the right eye is viewed by the right eye 30R. As a result, the viewer 30 can view the 3D image.

D. EFFECT

In the directional display device 1000 according to the present embodiment, in the longitudinal direction arrangement, the liquid crystal lens 17 is driven by the driving unit 20 such that the refractive power of the liquid crystal lens 17 becomes invalid, among the image light rays emitted from the image Lp for the left eye, the light rays which transmit through the first polarization control area 162a of the retardation film 16 and are made incident to the right eye 30R of the viewer 30 are shielded by the polarization plate 18, and, among the image right rays emitted from the image Rp for the right eye, the light rays which transmit through the first polarization control area 162a of the retardation film 16 and are made incident to the left eye 30L of the viewer 30 are shielded by the polarization plate 18. Thus, the image Lp for the left eye is made incident to only the left eye 30L and the image Rp for the right eye is made incident to only the right eye 30R such that the viewer 30 can view the 3D image. In the lateral direction arrangement, the liquid crystal lens 17 is driven by the driving unit 20 such that the refractive power of the liquid crystal lens 17 becomes valid, and the image light rays emitted from the image Lp for the left eye form the image at the position of the left eye 30L of the viewer 30 and the image light rays emitted from the image Rp for the right eye form the image at the position of the right eye 30R of the viewer 30 such that the viewer 30 can view the 3D image. Accordingly, in the directional display device 1000 according to the present embodiment, the viewer 30 can view the 3D image in either of the case where the display unit 10 is in the longitudinal direction arrangement and the case where the display unit is in the lateral direction arrangement.

In the directional display device 1000 according to the present embodiment, in the longitudinal direction arrangement, only the arrangement of the first polarization control area 162a and the second polarization control area 162b of the retardation film 16 are set with high precision such that the image light rays which are emitted from the pixels corresponding to the image Lp for the left eye of the liquid crystal panel 14 and are directed to the right eye 30R of the viewer 30 are shielded and the image light rays which are emitted from the pixels corresponding to the image Rp for the right eye and are directed to the left eye 30L of the viewer 30 are shielded. In the lateral direction arrangement, only the arrangement of the cylindrical lenses 172a included in the lens member 172 of the liquid crystal lens 17 are set with high precision such that the image light rays emitted from the pixels corresponding to the eye Lp for the left eye of the liquid crystal panel 14 form the image at the position of the left eye 30L of the viewer 30 and the image light rays emitted from the pixels corresponding to the eye Rp for the right eye of the liquid crystal panel 14 form the image at the position of the right eye 30R of the viewer 30. Accordingly, it is possible to realize the display of the 3D image with low deterioration in image quality in either of the longitudinal direction arrangement and the lateral direction arrangement.

E. MODIFIED EXAMPLE

Among the elements of the above-described embodiments, the elements other than the elements described in independent claims are additional elements and thus may be properly omitted. The invention is not limited to the above-described embodiments and may be modified without departing from the scope of the invention. For example, the following modifications are possible.

E1. Modified Example 1

Although the directional display device 1000 according to the above-described embodiments is the directional display device having the 3D display function for allowing different images to be viewed by the left eye and the right eye of the viewer such that the viewer views the 3D image, the invention is not limited thereto and is applicable to a directional display device having a multi-screen display function for providing different two-dimensional images to a plurality of viewers.

E2. Modified Example 2

Although, in the above-described embodiments, the retardation film 16 having the two different polarization control areas 162a and 162b is used, the invention is not limited thereto and, for example, a liquid crystal panel can be used. That is, various optical members capable of realizing the function of the polarization control unit having the two polarization control areas for changing the polarization axis of the incident light to two different polarization axes can be used.

E3. Modified Example 3

Although, in the above-described embodiment, the polarization control areas 162a and 162b of the retardation film 16 are arranged in the checkerwise manner (stepwise manner), the invention is not limited thereto and the polarization control areas 162a and 162b of the retardation film 16 may extend in a predetermined direction (the B direction of FIG. 4) or may extend in a direction inclined from the horizontal direction (lateral direction) and the vertical direction (longitudinal direction), instead of the checkerwise manner.

E4. Modified Example 4

Although, in the above-described embodiments, the liquid crystal panel 14 of the display panel 12 uses a TN method using TN liquid crystal having optical rotation of 90° and the incident side polarization plate 13 and the emission side polarization plate 15 are arranged so as to face each other with the liquid crystal panel 14 interposed therebetween and have the polarization axes which are perpendicular to each other, the invention is not limited thereto and a liquid crystal panel using other methods such as a vertical alignment (VA) method and an electrically controlled birefringence (ECB) method may be used. In this case, for example, if the VA method is used, the incident side polarization plate 13 and the emission side polarization plate 15 with the liquid crystal panel 14 interposed therebetween are configured by the polarization plates having the same polarization axis and the polarization axis of the retardation film 16, the liquid crystal lens 17 and the polarization plate 18 are set to correspond to the polarization axis of the liquid crystal panel 14, the incident side polarization plate 13 and the emission side polarization plate 15.

E5. Modified Example 5

Although, in the above-described embodiments, the polarization axes of the incident side polarization plate 13, the emission side polarization plate 15, the first polarization control area 162a of the retardation film 16, the second polarization control area 162b, the liquid crystal lens 17 and the polarization plate 18 are respectively about 135°, 45°, 75°, 15°, 120° and 45°, the invention is not limited thereto and the polarization axes of the incident side polarization plate 13, the emission side polarization plate 15, the first polarization control area 162a of the retardation film 16, the second polarization control area 162b, the liquid crystal lens 17 and the polarization plate 18 may set other values. In this case, by optimizing the polarization axes, in the case where the display unit is arranged in the lateral direction, it is possible to reduce the loss generated when the polarization axis of the light incident to the polarization plate 18 is changed to the polarization axis of the polarization plate 18. Accordingly, the viewer can view a bright image.

E6. Modified Example 6

In the directional display device 1000 according to the above-described embodiments, although the 3D image or the multi-screen image can be viewed by the viewer, the liquid crystal lens 17 is driven by the driving unit 20 such that the state of the liquid crystal layer 173 of the liquid crystal lens 17 becomes a state between the on state and the off state and the separation of the plurality of images becomes incomplete. Thus, it is possible to provide a two-dimensional image to the viewer.

What is claimed is:

1. A directional display device which separates and displays a plurality of images displayed on an image display surface of a display panel in a plurality of different viewing direction, the directional display device comprising:
   a polarization control unit which is arranged in front of the display panel;
   a liquid crystal lens which is arranged in front of the polarization control unit; and
   a polarization plate which is arranged in front of the liquid crystal lens,
   wherein the polarization control unit has first and second polarization areas which change incident light rays to light rays having different polarization axes,
   the liquid crystal lens includes a lens layer including a plurality of lenses having a predetermined refractive index and a liquid crystal layer, an alignment state of the liquid crystal layer is changed so as to change the refractive index of the liquid crystal layer and change the refractive power of the liquid crystal lens, and the polarization axis of the light rays incident to the liquid crystal lens is changed,
   in a state in which the display panel is arranged in a first direction in which longitudinal and lateral directions of the image display surface are previously determined, the refractive power of the liquid crystal lens becomes invalid, and the polarization axis of the light rays incident from the polarization control unit is changed such that, among the light rays incident from the polarization control unit, light rays emitted from the first polarization area are shielded and light rays emitted from the second polarization area transmit through the polarization plate, and the plurality of images are separated in the plurality of viewing direction, and
   in a state in which the display panel is arranged in a second direction in which the longitudinal and lateral directions of the image display surface are inverted from those of the first direction, the refractive power of the liquid crystal lens is set to a predetermined level, the polarization axis of the light rays incident from the polarization control unit is changed such that the light rays incident from the polarization control unit to the liquid crystal lens transmit through the polarization plate regardless of from which of the first polarization area and the second polarization area the light rays are emitted, and the plurality of images are separated in the plurality of viewing direction.

2. The directional display device according to claim 1, wherein the first polarization area and the second polarization area are arranged in directions inclined from the longitudinal and lateral directions of the image display surface in a state in which the display panel is arranged in the first direction.

3. The directional display device according to claim 1, wherein the lens layer of the liquid crystal lens is arranged such that the plurality of lenses having a semicylindrical shape have curved surfaces in the lateral direction in a state in which the display panel is arranged in the second direction.

4. The directional display device according to claim 1, wherein the polarization control unit is composed of a retardation plate having the first polarization area and the second polarization area.

5. The directional display device according to claim 1, wherein the polarization control unit is composed of a liquid crystal panel having the first polarization area and the second polarization area.

6. The directional display device according to claim 1, wherein, when the display panel is arranged in the first direction and the second direction, the refractive power of the liquid crystal lens is set to an intermediate level smaller than the predetermined level such that the same image is displayed in the plurality of viewing directions.

* * * * *